United States Patent
Chen et al.

(10) Patent No.: US 12,014,473 B2
(45) Date of Patent: Jun. 18, 2024

(54) INTELLIGENT ZOOMING METHOD AND ELECTRONIC DEVICE USING THE SAME

(71) Applicant: Acer Incorporated, New Taipei (TW)

(72) Inventors: En-Shin Chen, New Taipei (TW);
An-Cheng Lee, New Taipei (TW);
Hsu-Yang Chang, New Taipei (TW);
Ying-Shih Hung, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 131 days.

(21) Appl. No.: 17/897,655

(22) Filed: Aug. 29, 2022

(65) Prior Publication Data

US 2023/0082451 A1    Mar. 16, 2023

(30) Foreign Application Priority Data

Sep. 10, 2021 (TW) .................................. 110133784

(51) Int. Cl.
*G06T 3/40* (2024.01)
*G06F 40/174* (2020.01)
(Continued)

(52) U.S. Cl.
CPC .............. *G06T 3/40* (2013.01); *G06F 40/174* (2020.01); *G06T 7/11* (2017.01); *G06T 7/60* (2013.01); *G06T 11/60* (2013.01); *G06T 2207/20084* (2013.01); *G06T 2207/20132* (2013.01); *G06T 2210/22* (2013.01)

(58) Field of Classification Search
CPC ..... G06T 7/11; G06T 7/60; G06T 3/40; G06T 11/60; G06T 2207/20084;
(Continued)

(56) References Cited

U.S. PATENT DOCUMENTS

| 2010/0026721 A1* | 2/2010 | Park | G09G 5/14 |
| | | | 345/660 |
| 2012/0139844 A1* | 6/2012 | Ramstein | G06F 3/016 |
| | | | 345/173 |

(Continued)

FOREIGN PATENT DOCUMENTS

| CN | 101923723 B | 11/2012 |
| CN | 102567300 B | 11/2013 |

(Continued)

*Primary Examiner* — Xilin Guo
(74) *Attorney, Agent, or Firm* — Birch, Stewart, Kolasch & Birch, LLP

(57) ABSTRACT

An intelligent zooming method and an electronic device using the same are provided. The intelligent zooming method includes the following steps. A text paragraph corresponding to the text is merged. The text paragraph is automatically arranged according to the text paragraph and a text magnification box. The text paragraph in the text magnification box is enlarged according to a text magnification ratio. A block group containing the block and other blocks connected thereto is merged. A block magnification ratio is adjusted according to the block group and a block magnification box. The block group in the block magnification box is enlarged according to the block magnification ratio. The picture is cropped to obtain an object. A picture magnification ratio is adjusted according to the object and a picture magnification box. The object in the picture magnification box is enlarged according to the picture magnification ratio.

20 Claims, 10 Drawing Sheets

(51) Int. Cl.
*G06T 7/11* (2017.01)
*G06T 7/60* (2017.01)
*G06T 11/60* (2006.01)

(58) Field of Classification Search
CPC ....... G06T 2207/20132; G06T 2210/22; G06F 40/174; G06F 40/103
See application file for complete search history.

(56) References Cited

U.S. PATENT DOCUMENTS

| | | | |
|---|---|---|---|
| 2014/0344678 A1* | 11/2014 | Chae | G06F 3/04886 715/256 |
| 2016/0132478 A1* | 5/2016 | Jung | G06F 40/106 715/224 |
| 2016/0349970 A1* | 12/2016 | Everitt | G06F 3/04883 |
| 2019/0286302 A1* | 9/2019 | Reid | G06F 3/0482 |
| 2021/0227082 A1* | 7/2021 | Mori | H04N 1/00331 |

FOREIGN PATENT DOCUMENTS

| | | |
|---|---|---|
| CN | 109766458 A | 5/2019 |
| TW | I234994 | 6/2005 |
| TW | I318758 | 12/2009 |
| TW | I334588 | 12/2010 |
| TW | 201108722 A1 | 3/2011 |
| TW | I494842 B | 8/2015 |
| TW | I523486 B | 2/2016 |
| TW | M582273 U | 8/2019 |

* cited by examiner

INTELLIGENT ZOOMING METHOD AND ELECTRONIC DEVICE USING THE SAME

This application claims the benefit of Taiwan application Serial No. 110133784, filed Sep. 10, 2021, the disclosure of which is incorporated by reference herein in its entirety.

TECHNICAL FIELD

The invention relates in general to an information processing method and an electronic device using the same, and more particularly to an intelligent zooming method and an electronic device using the same.

BACKGROUND

Slides can clearly present texts, blocks and pictures, and therefore are widely used in presentation. During the presentation, the presenter usually needs to enlarge a particular content for the convenience of explanation. However, the magnifier provided by currently available operating systems or application programs can only enlarge a particular region with a fixed size. If the to-be-enlarged content is too large, for example, a long sentence, the presenter needs to repeatedly operate the mouse and adjust the enlarged region, causing inconvenience and interference to both the presenter and the audience.

SUMMARY

The invention is directed to an intelligent zooming method and an electronic device using the same capable of adaptively enlarging heterogeneous text TX, block BK or picture DW on the slide 900, so that the enlarged text paragraph PG, block group BG or object OB can be displayed in the text magnification box MGt, the block magnification box MGb, the picture magnification box MGd in a most suitable way without bothering the presenter to repeatedly operate the mouse to move the text magnification box MGt, the block magnification box MGb, or the picture magnification box MGd.

According to one embodiment, an intelligent zooming method is provided. The intelligent zooming method for zooming in a text, a block or a picture is executed by an electronic device. The intelligent zooming method includes the following steps. A text paragraph corresponding to the text is merged. The text paragraph is automatically arranged according to the text paragraph and a text magnification box. The text paragraph in the text magnification box is enlarged according to a text magnification ratio. A block group containing the block and other blocks connected thereto is merged. A block magnification ratio is adjusted according to the block group and a block magnification box. The block group in the block magnification box is enlarged according to the block magnification ratio. The picture is cropped to obtain an object. A picture magnification ratio is adjusted according to the object and a picture magnification box. The object in the picture magnification box is enlarged according to the picture magnification ratio.

According to one embodiment, an electronic device with an intelligent zooming function is provided. The intelligent zooming function is for zooming in a text, a block or a picture. The electronic device includes a text merging unit, an automatic line-feed unit, a text enlarging unit, a block merging unit, a block magnification ratio adjusting unit, a block enlarging unit, a picture cropping unit, a picture magnification ratio adjusting unit and a picture enlarging unit. The text merging unit is used to merge a text paragraph corresponding to the text. The automatic line-feed unit is used to automatically arrange the text paragraph according to the text paragraph and a text magnification box. The text enlarging unit is used to enlarge the text paragraph in the text magnification box according to a text magnification ratio. The block merging unit is used to merge a block group containing the block and other blocks connected thereto. The block magnification ratio adjusting unit is used to adjust a block magnification ratio according to the block group and a block magnification box. The block enlarging unit is used to enlarge the block group in the block magnification box according to the block magnification ratio. The picture cropping unit is used to crop the picture to obtain to obtain an object. The picture magnification ratio adjusting unit is used to adjust a picture magnification ratio according to the object and a picture magnification box. The picture enlarging unit is used to enlarge the object in the picture magnification box according to the picture magnification ratio.

The above and other aspects of the invention will become better understood with regard to the following detailed description of the preferred but non-limiting embodiment(s). The following description is made with reference to the accompanying drawings.

DETAILED DESCRIPTION

Figure 1:
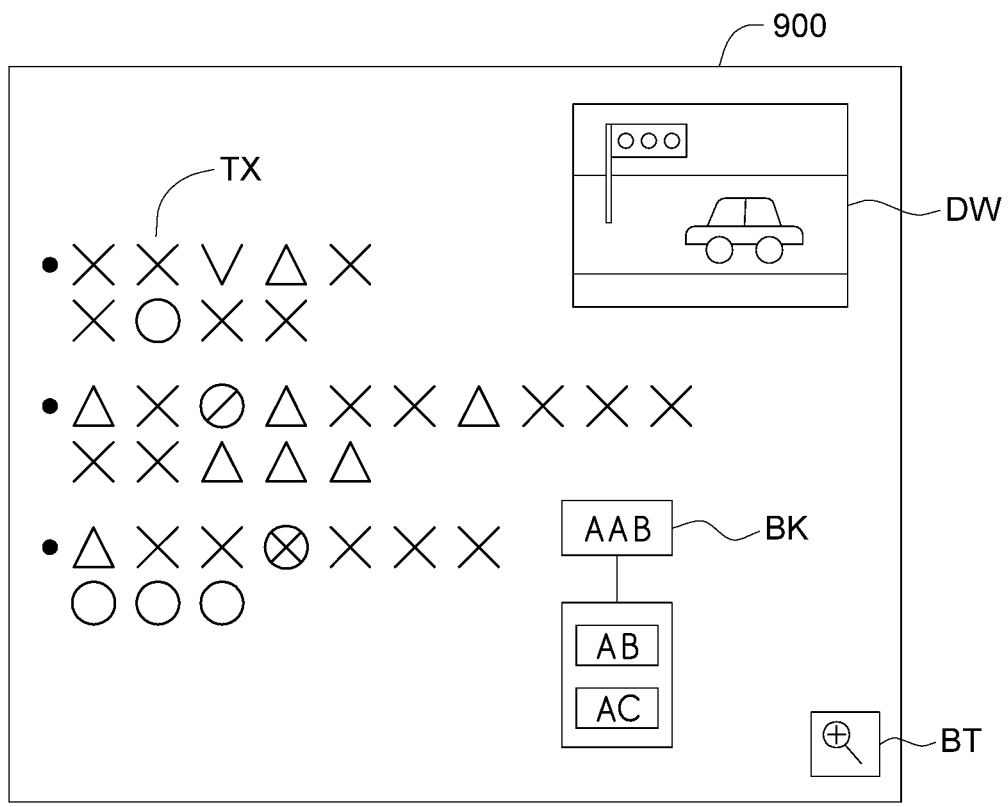
FIG. 1 is a schematic diagram of a slide according to an embodiment.

Referring to FIG. 1, a schematic diagram of a slide 900 according to an embodiment is shown. The slide 900 contains, for example, a text TX, a block BK or a picture DW. The text TX can be formed of independent letters, words, or symbols. A number of texts TX can form a paragraph or a sentence. The block BK can be a text block or a table block. The picture DW can be a photo or a drawing. The text TX, the block BK and the picture DW are heterogeneous objects with different characteristics. When enlarging a partial content of the slide 900, the intelligent zooming method according to the present embodiment can adaptively perform most suitable enlargement on the text TX, the block BK or the picture DW to increase the efficiency of presentation.

Figure 2:
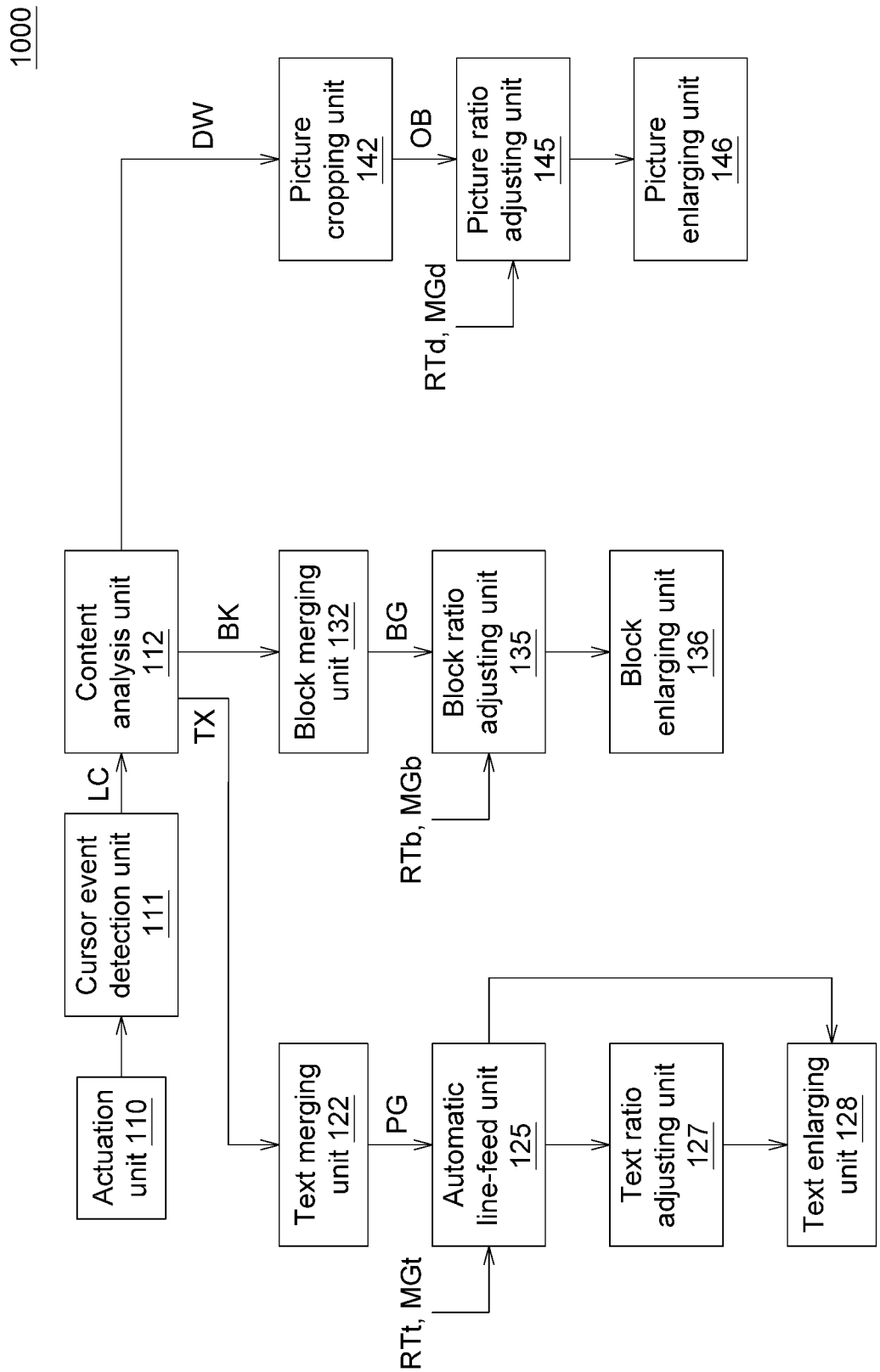
FIG. 2 is a block diagram of an electronic device with an intelligent zooming function according to an embodiment.
Figure 3A:
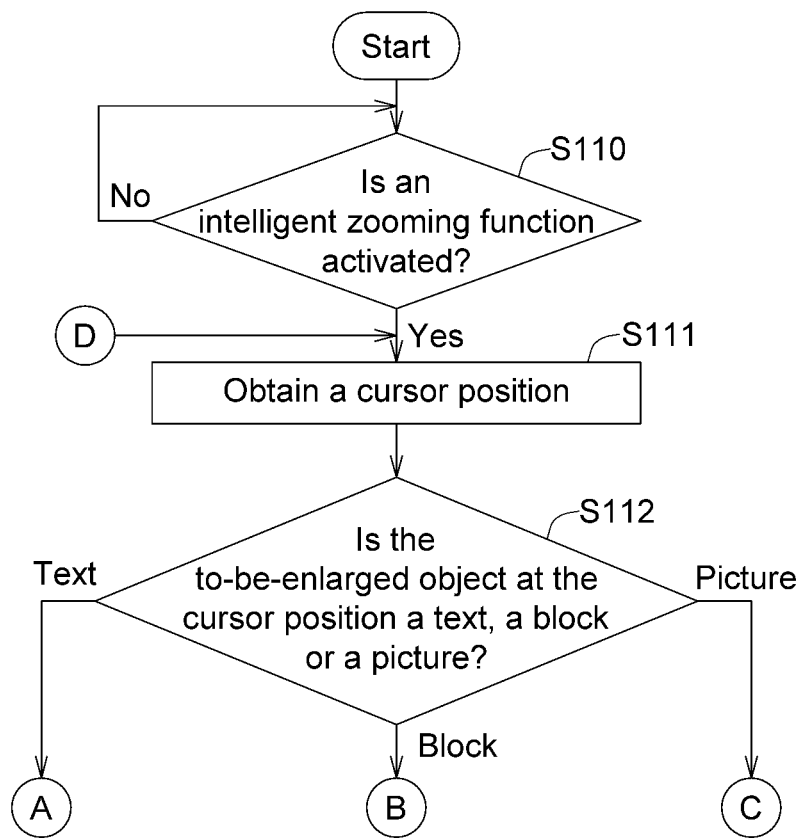
FIGS. 3A to 3D are a flowchart of an intelligent zooming method according to an embodiment.
Figure 3B:
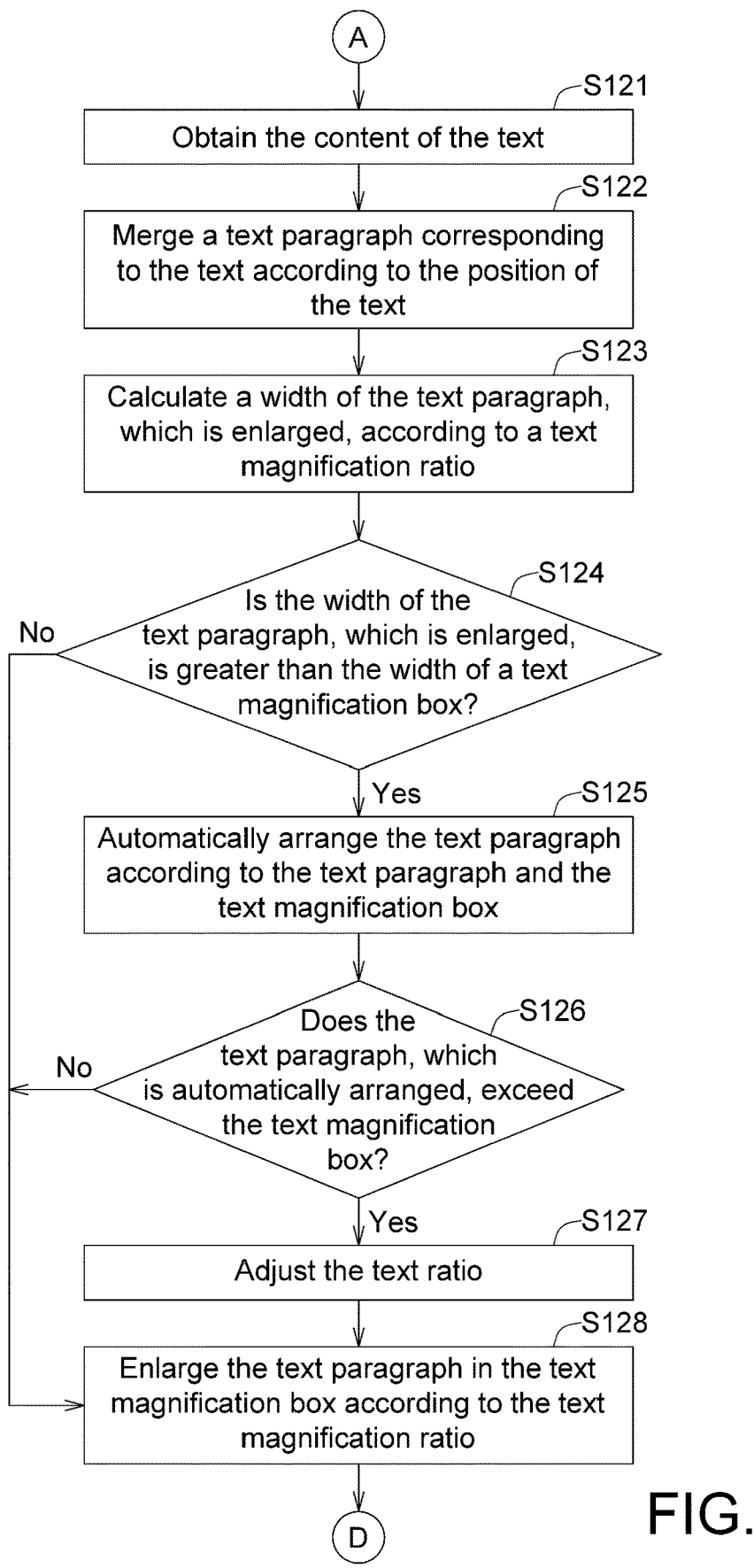
Figure 3C:
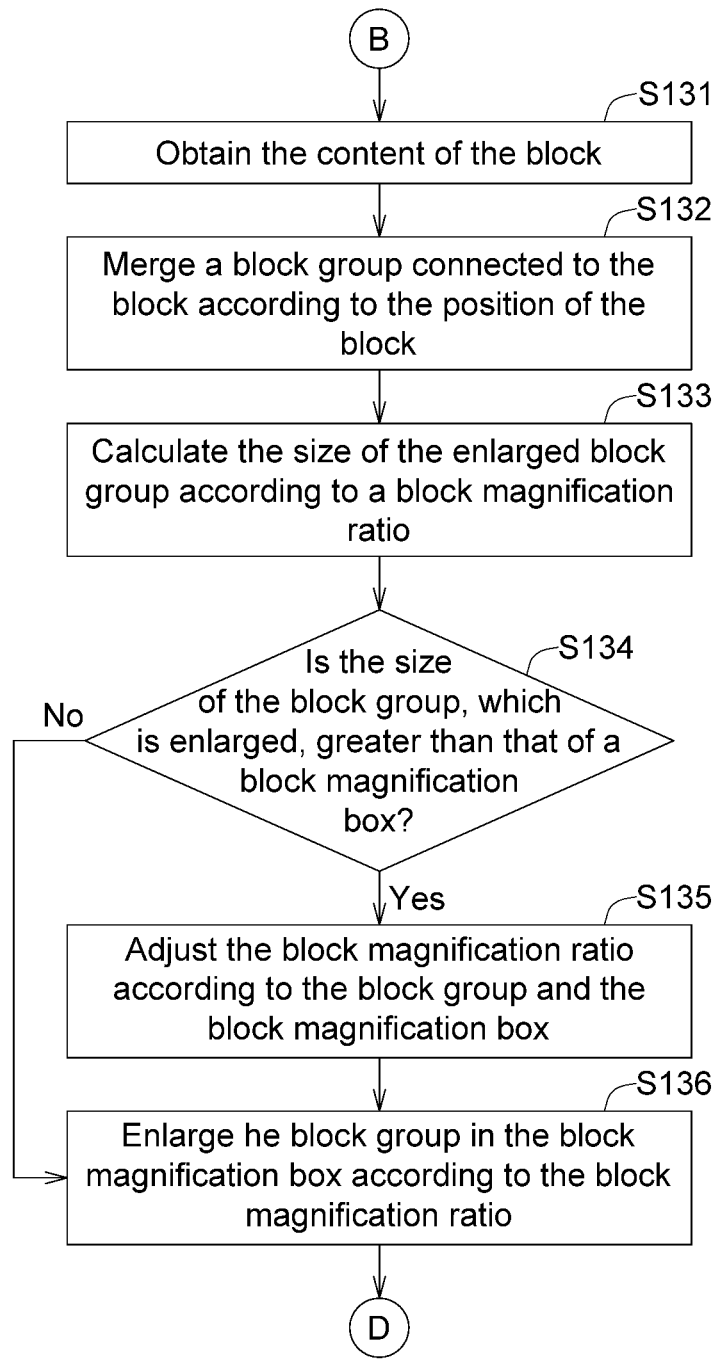
Figure 3D:
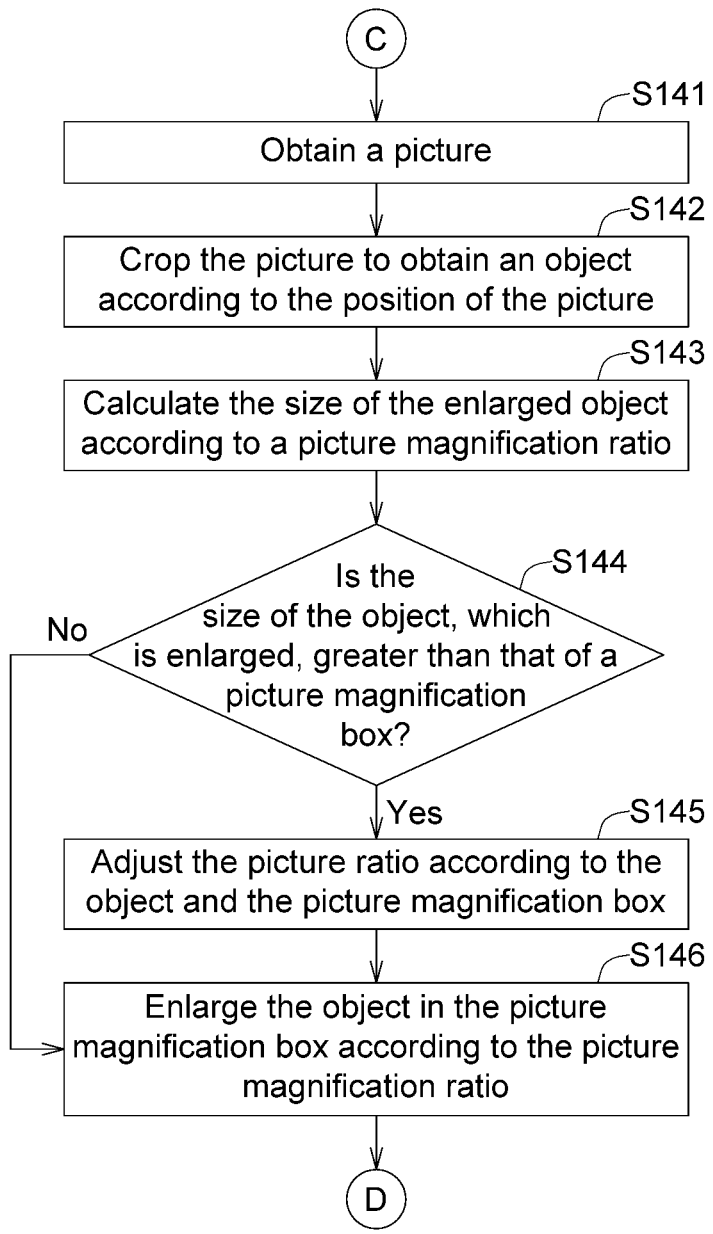

Referring to FIG. 2, a block diagram of an electronic device 1000 with an intelligent zooming function according to an embodiment is shown. The electronic device 1000 can be realized by such as a notebook, a desktop, a server, a tablet, or a smartphone. The electronic device 1000 includes an actuation unit 110, a cursor event detection unit 111, a content analysis unit 112, a text merging unit 122, an automatic line-feed unit 125, a text magnification ratio adjusting unit 127, a text enlarging unit 128, a block merging unit 132, a block magnification ratio adjusting unit 135, a block enlarging unit 136, a picture cropping unit 142, a picture magnification ratio adjusting unit 145, and a picture enlarging unit 146.

The actuation unit 110 is used to activate an intelligent zooming function according to a condition. For example, the presenter can click a zoom button BT of FIG. 1 to activate the intelligent zooming function.

The cursor event detection unit 111 is used to detect button clicking and cursor movement by using an application interface (API) of the slide playback software. Button clicking and cursor movement can be controlled by the presenter using a mouse or a briefing pen.

The content analysis unit 112 is used to analyze the content of each page of the slide 900 using slide definition file (slideX.xml).

The text merging unit 122, the automatic line-feed unit 125, the text magnification ratio adjusting unit 127 and the text enlarging unit 128 are used to process the text TX to achieve an enlargement effect.

The block merging unit 132, the block magnification ratio adjusting unit 135 and the block enlarging unit 136 are used to process the block BK to achieve an enlargement effect.

The picture cropping unit 142, the picture magnification ratio adjusting unit 145 and the picture enlarging unit 146 is used to process the picture DW to achieve an enlargement effect.

The actuation unit 110, the cursor event detection unit 111, the content analysis unit 112, the text merging unit 122, the automatic line-feed unit 125, the text magnification ratio adjusting unit 127, the text enlarging unit 128, the block merging unit 132, the block magnification ratio adjusting unit 135, the block enlarging unit 136, the picture cropping unit 142, the picture magnification ratio adjusting unit 145 and the picture enlarging unit 146 individually or a combination thereof can be integrated on a chip, a circuit, a circuit board or a computer program product or a storage device for storing a computer program product. Operations of each of the abovementioned elements are disclosed below with an accompanying flowchart.

Referring to FIGS. 3A to 3D, a flowchart of an intelligent zooming method of a slide 900 according to an embodiment is shown. The intelligent zooming method of the slide 900 can be executed by an electronic device 1000. In step S110, whether an intelligent zooming function is activated is determined by the actuation unit 110. As indicated in FIG. 1, when the slide 900 is in a playback state, a zoom button BT can be displayed. Once the cursor event detection unit 111 detects that the zoom button BT is clicked, the actuation unit 110 determines that the intelligent zooming function is activated. In another embodiment, a hot key can be configured on the keyboard. Once it is detected that the hot key is pressed, the actuation unit 110 determines that the intelligent zooming function is activated. On the other hand, the intelligent zooming function can be turned off using an ESC key. When the intelligent zooming function is activated, the method proceeds to step S111.

In step S111, a cursor position LC is obtained by the cursor event detection unit 111. The cursor position LC corresponds to the coordinates of the screen coordinate system.

In step S112 as indicated in FIG. 1, whether the to-be-enlarged object at the cursor position LC is a text TX, a block BK or a picture DW is analyzed by the content analysis unit 112. After analyzing the corresponding attribute of the cursor position LC according to the slide definition file, the content analysis unit 112 can obtain whether the to-be-enlarged object is the text TX, the block BK or the picture DW. If the to-be-enlarged object is the text TX, the method proceeds to step S121; if the to-be-enlarged object is the block BK, the method proceeds to step S131; if the to-be-enlarged object is the picture DW, the method proceeds to step S141.

Figure 4:
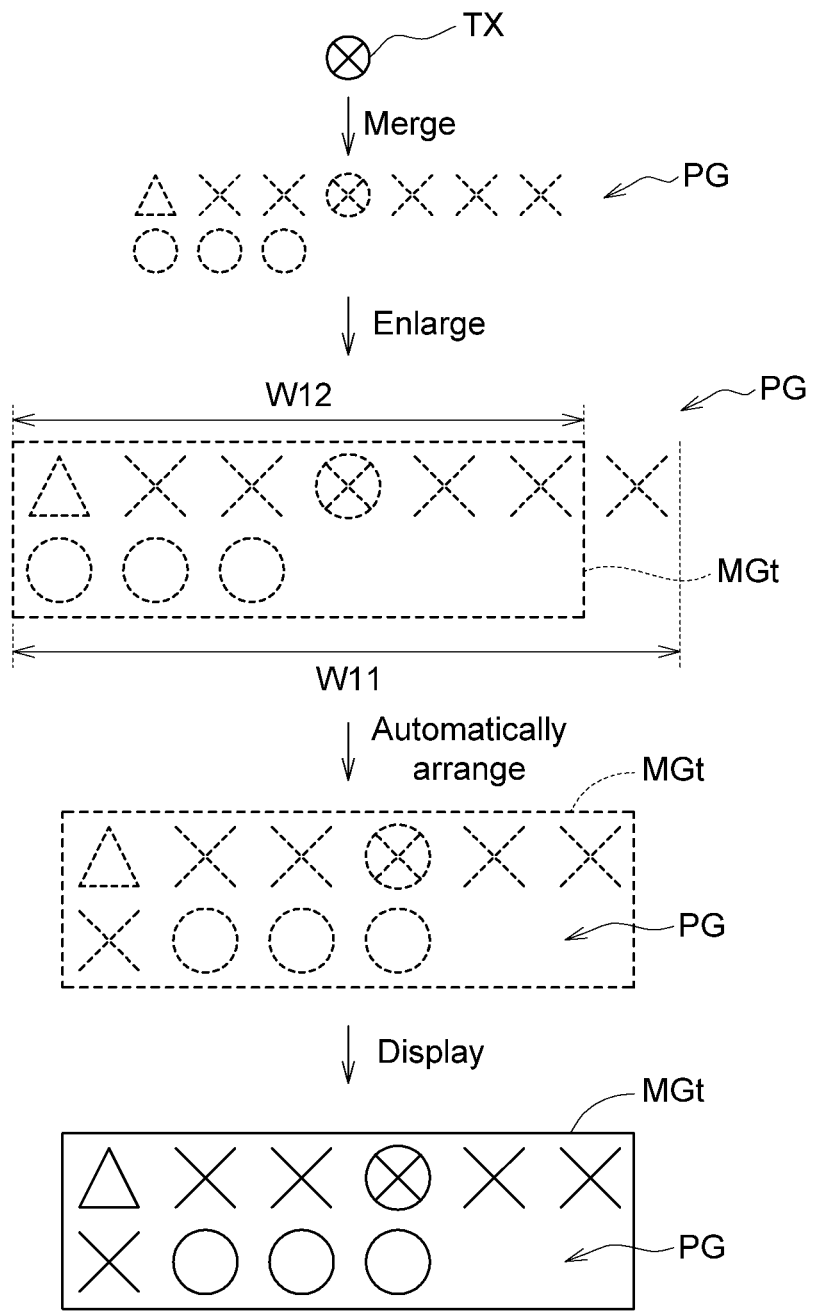
FIG. 4 is an illustrative diagram of an example of steps S121 to S128.

Referring to FIG. 4, an illustrative diagram of an example of steps S121 to S128 is shown. In step S121, the content of the text TX is obtained by the content analysis unit 112. In the present step, the content analysis unit 112 obtains a single word.

In step S122, a text paragraph PG corresponding to the text TX is merged by the text merging unit 122 at the background according to the position of the text TX. The text paragraph PG can be several lines of text composed of words and symbols. In FIG. 4, dotted lines represent background operations.

In step S123, the width W11 of the enlarged text paragraph PG is calculated by the automatic line-feed unit 125 at the background according to a text magnification ratio RTt (such as 1.5×). In FIG. 4, dotted lines represent background operations.

In step S124, whether the width W11 of the enlarged text paragraph PG is greater than the width W12 of a text magnification box MGT is determined by the automatic line-feed unit 125 at the background. The text magnification box MGT is such as a horizontal rectangular region. If the width W11 of the enlarged text paragraph PG is greater than the width W12 of the text magnification box MGT, the method proceeds to step S125; if the width W11 of the enlarged text paragraph PG is not greater than the width W12 of the text magnification box MGT, the method proceeds to step S128.

In the example illustrated in FIG. 4, the width W11 of the enlarged text paragraph PG is greater than the width W12 of the text magnification box MGT.

In step S125, the enlarged text paragraph PG is automatically arranged by the automatic line-feed unit 125 at the background according to the enlarged text paragraph PG and the text magnification box MGt. As exemplified in FIG. 4, the enlarged text paragraph PG exceeds the text magnification box MGT by a character; therefore the automatic line-feed unit 125 moves the exceeding character to the next line to obtain the automatically arranged text paragraph PG. In FIG. 4, dotted lines represent background operations.

In step S126, whether the automatically arranged text paragraph PG exceeds the text magnification box MGt is determined by the text magnification ratio adjusting unit 127 at the background. If the automatically arranged text paragraph PG exceeds the text magnification box MGt, the method proceeds to step S127; if the automatically arranged text paragraph PG does not exceed the text magnification box MGt, the method proceeds to step S128. In FIG. 4, dotted lines represent background operations.

As indicated in FIG. 4, the automatically arranged text paragraph PG does not exceed the text magnification box MGt, therefore the method proceeds to step S128.

In step S128, the text paragraph PG is enlarged in the text magnification box MGt by the text enlarging unit 128 according to the text magnification ratio RTt. All the above steps S121 to S126 are executed at the background and are not shown on the slide 900. Only after the text paragraph has been automatically arranged and the text magnification ratio RTt has been confirmed will the method proceed to step S128 to display the enlarged and automatically arranged text paragraph PG on the slide 900.

As indicated in FIG. 4, the presenter can make the entire content of the text paragraph PG enlarged and completely presented without having to move the text magnification box MGt. Besides, when any text TX of the text paragraph PG is pointed by the cursor, the text paragraph PG will be enlarged, and there is no need to repeat the calculation or move the text magnification box MGt.

Figure 5:
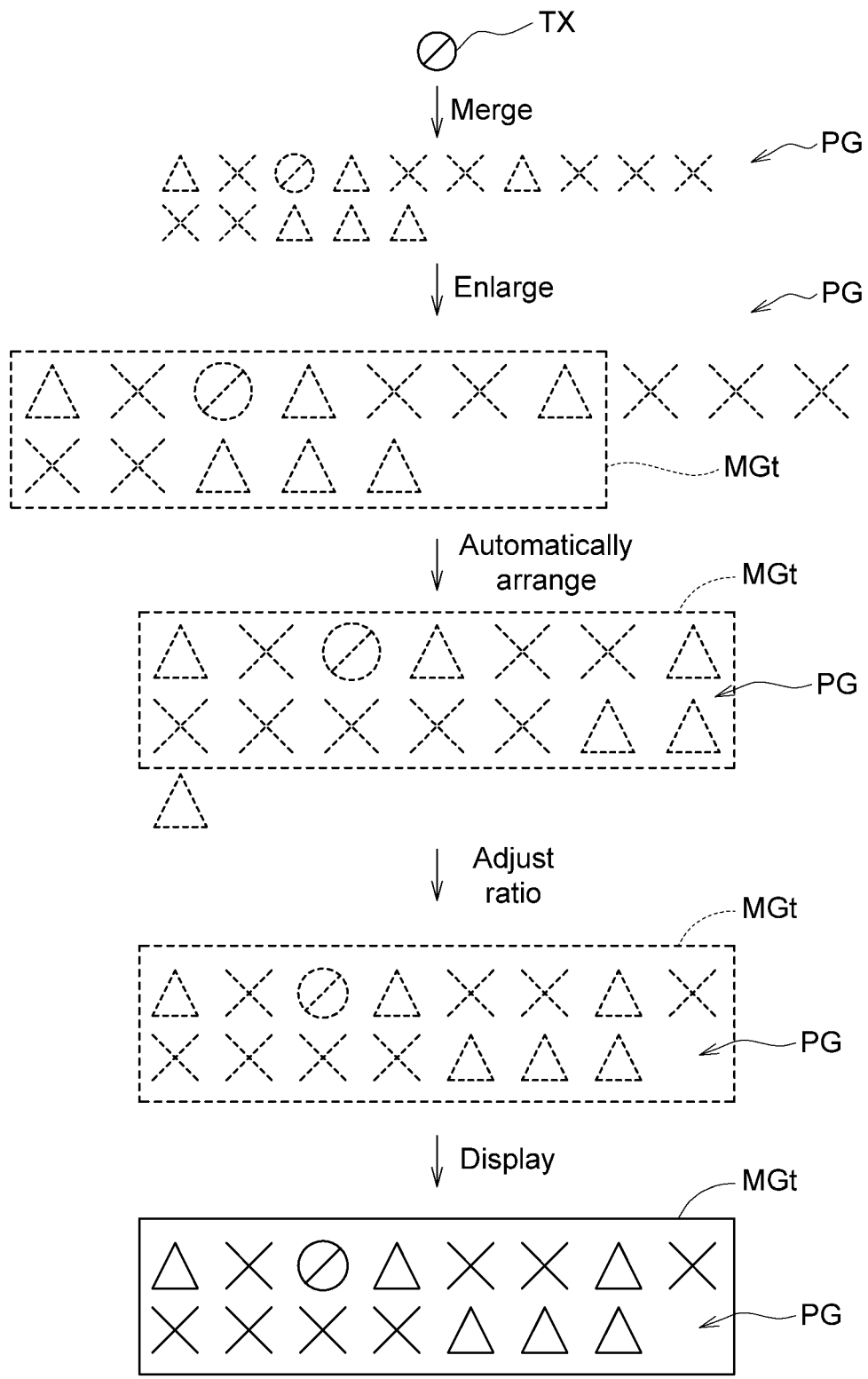
FIG. 5 is an illustrative diagram of another example of steps S121 to S128.

Referring to FIG. 5, an illustrative diagram of another example of steps S121 to S128 is shown. As exemplified in FIG. 5, after the enlarged text paragraph PG is automatically arranged, the method proceeds to step S126. In step S126, whether the automatically arranged text paragraph PG exceeds the text magnification box MGt is determined by the text magnification ratio adjusting unit 127 at the background. If the automatically arranged text paragraph PG exceeds the text magnification box MGt, the method proceeds to step S127; if the automatically arranged text paragraph PG does not exceed the text magnification box MGt, the method proceeds to step S128. In FIG. 5, dotted lines represent background operations.

As exemplified in FIG. 5, the automatically arranged text paragraph PG exceeds the text magnification box MGt, therefore the method proceeds to step S127.

In step S127, the text magnification ratio RTt (such as reduced to 1.2×) is adjusted by the text magnification ratio adjusting unit 127 at the background, so that the automatically arranged text paragraph PG will not exceed the text magnification box MGt. In FIG. 5, dotted lines represent background operations.

In step S128, the text paragraph PG is enlarged in the text magnification box MGt by the text enlarging unit 128 according to the text magnification ratio RTt. As indicated in FIG. 5, the presenter can make the entire content of the text paragraph PG enlarged and completely presented without having to move the text magnification box MGt.

In other words, when the width of the text paragraph PG is too wide or may exceed the width of the text magnification box MGt, through the implementation of the technology of the present embodiment, each character can be enlarged, and all characters can be displayed in the text magnification box MGt without bothering the presenter to move the text magnification box MGt.

In the determination step S112, if the to-be-enlarged object is the block BK, the method proceeds to step S131.

Figure 6:
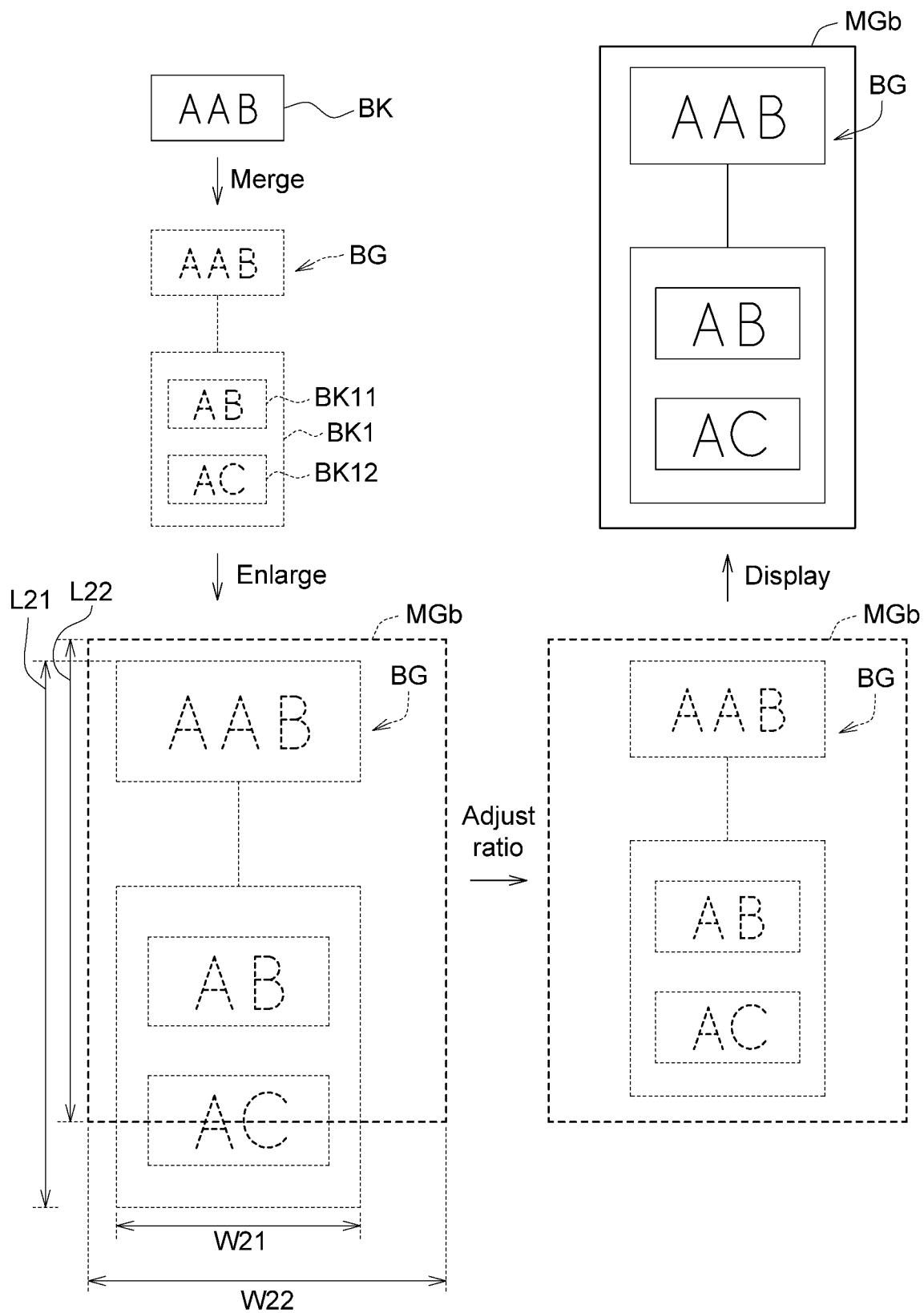
FIG. 6 is an illustrative diagram of an example of steps S131 to S136.

Referring to FIG. 6, an illustrative diagram of an example of steps S131 to S136 is shown. In step S131, the content of the block BK is obtained by the content analysis unit 112. In the present step, the content analysis unit 112 obtains a single block BK.

In step S132, a block group BG connected to the block BK is merged by the block merging unit 132 at the background according to the position of the block BK. As indicated in FIG. 6, the block BK1 is connected to the block BK, therefore both the block BK and the block BK1 are merged to the block group BG. The blocks BK11 and BK12 are contained in the block BK1, and therefore are merged to the block group BG. In FIG. 6, dotted lines represent background operations.

In step S133, the size of the enlarged block group BG (such as length L21 and width W21) is calculated by the block magnification ratio adjusting unit 135 at the background according to a block magnification ratio RTb (such as 1.5×). In FIG. 6, dotted lines represent background operations.

In step S134, whether the size of the enlarged block group BG is greater than that of a block magnification box MGb is determined by the block magnification ratio adjusting unit 135 at the background. The block magnification box MGb is such as a vertical rectangular region; the size of the block magnification box MGb is such as length L22 and width W22. In the present step, the block magnification ratio adjusting unit 135 determines whether the length L21 is greater than the length L22 or whether the width W21 is greater than the width W22. If any of the two determinations is affirmative, it can be determined that the size of the enlarged block group BG is greater than that of the block magnification box MGb. In FIG. 6, dotted lines represent background operations.

Or, the block magnification ratio adjusting unit 135 determines whether the enlarged block group BG is completely covered by the block magnification box MGb. If the block group BG is not completely covered by the block magnification box MGb, it can be determined that the size of the enlarged block group BG is greater than that of the block magnification box MGb.

In another embodiment, to avoid the boundaries of the block magnification box MGb overlapping that of the block group BG, the block magnification ratio adjusting unit 135 can determine at the background whether the size of the enlarged block group BG plus 1 unit length is greater than the size of the block magnification box MGb.

As exemplified in FIG. 6, the length L21 of the enlarged block group BG is greater than the length L22 of the block magnification box MGb, therefore the method determines that the size of the enlarged block group BG is greater than that of the block magnification box MGb, and proceeds to step S135.

In step S135, the block magnification ratio RTb is adjusted by the block magnification ratio adjusting unit 135 at the background according to the block group BG and the block magnification box MGb, so that the size of the enlarged block group BG will not be greater than that of the block magnification box MGb. In FIG. 6, dotted lines represent background operations.

In step S136, the block group BG is enlarged in the block magnification box MGb by the block enlarging unit 136 according to the block magnification ratio RTb. As indicated in FIG. 6, the presenter can make the entire content of the block group BG enlarged and completely presented without having to move the block magnification box MGb.

In other words, when the width of the block group BG is too wide or may exceed the width of the block magnification box MGb, through the implementation of the technology of the present embodiment, each character can be enlarged, and all characters can be displayed in the block magnification box MGb without bothering the presenter to move the block magnification box MGb.

Besides, when any block BK of the block group BG is pointed by the cursor, the block group BG will be enlarged, and there is no need to repeat the calculation or move the block magnification box MGb.

In the determination of step S112, if the to-be-enlarged object is the picture DW, the method proceeds to step S141.

Figure 7:
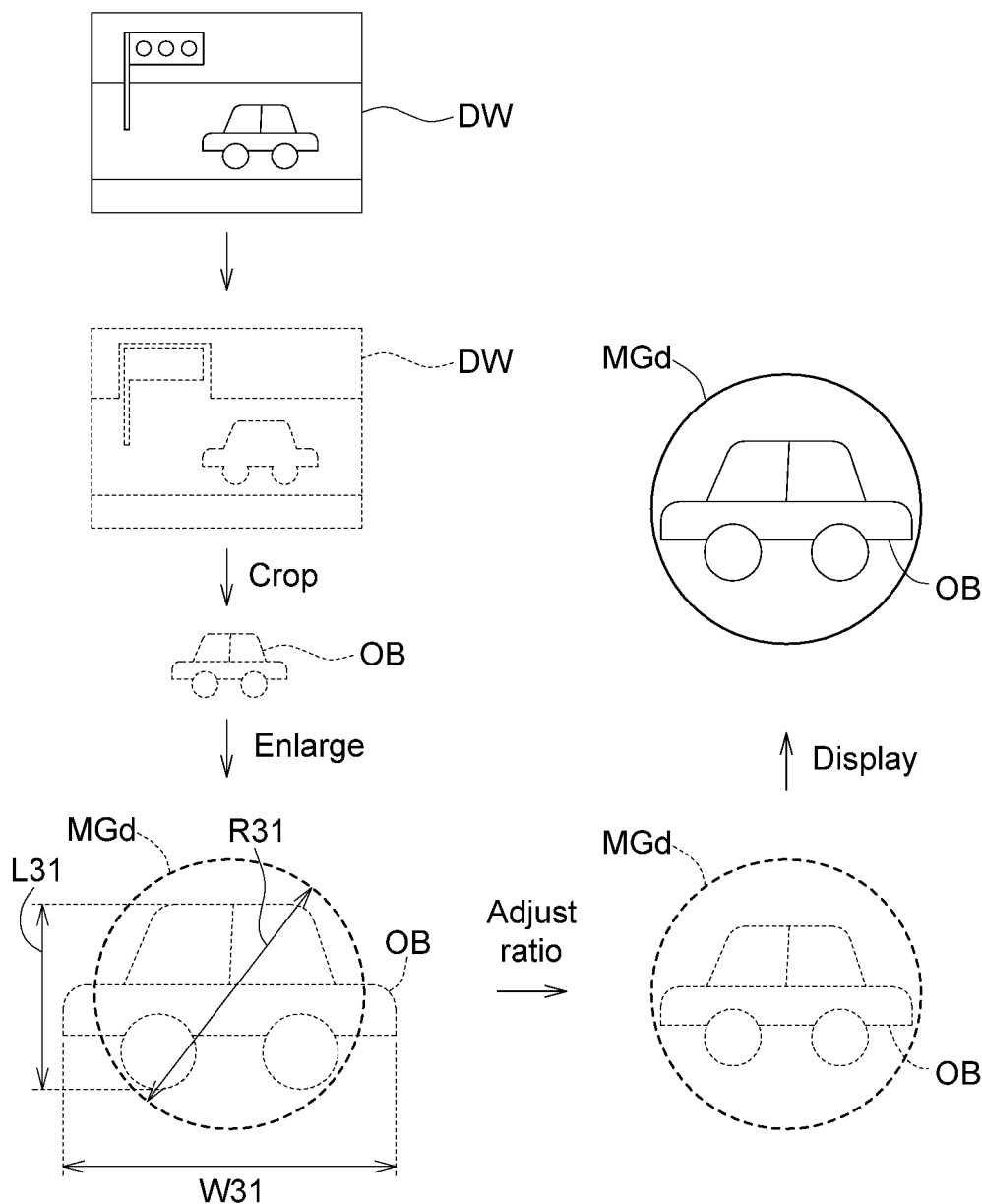
FIG. 7 is an illustrative diagram of an example of steps S141 to S146.

Referring to FIG. 7, an illustrative diagram of an example of steps S141 to S146 is shown. In step S141, a picture DW is obtained by the content analysis unit 112. In the present step, the content analysis unit 112 obtains the picture DW corresponding to the cursor from the slide 900.

In step S142, the picture DW is cropped to obtain an object OB by the picture cropping unit 142 at the background. In the present step, the picture cropping unit 142 crops the picture DW to obtain a number of candidate objects by using the semantic segmentation algorithm, and further selects the object OB corresponding to the cursor from the candidate objects. The semantic segmentation algorithm is such as fully-connect neural network (FNN)

algorithm, or recurrent neural network (RNN) algorithm. The picture cropping unit 142 obtains the object OB pointed by the cursor. In FIG. 7, dotted lines represent background operations.

In step S143, the size of the enlarged object OB (such as length L31 and the width W31) is calculated by the picture magnification ratio adjusting unit 145 at the background according to a picture magnification ratio RTd (such as 1.5×). In an embodiment, the text magnification ratio RTt, the block magnification ratio RTb and the picture magnification ratio RTd mentioned above are substantially equivalent before adjustments are made. That is, at the beginning, the text TX, the block BK and the picture DW are firstly enlarged according to the same magnification ratio at the background and then are adjusted. In FIG. 7, dotted lines represent background operations.

In step S144, whether the size of the enlarged object OB is greater than that of a picture magnification box MGd is determined by the picture magnification ratio adjusting unit 145. The picture magnification box MGd is such as a circular region, the size of the picture magnification box MGd is such as a diameter R31. In the present step, the picture magnification ratio adjusting unit 145 determines whether the length L31 is greater than the diameter R31 or whether the width W31 is greater than the diameter R31. If any of the two determinations is affirmative, the method determines that the size of the enlarged object OB is greater than the picture magnification box MGd. In FIG. 7, dotted lines represent background operations.

Or, the picture magnification ratio adjusting unit 145 determines whether the enlarged object OB is completely covered by the picture magnification box MGd. If the object OB is not completely covered by the picture magnification box MGd, the method determines that the size of the enlarged object OB is greater than that of the picture magnification box MGd.

The text magnification box MGt, the block magnification box MGb and the picture magnification box MGd mentioned above have different sizes and shapes, so that they can match the heterogeneous text TX, block BK and picture DW.

As exemplified in FIG. 7, both the length L31 and width W31 of the enlarged object OB are greater than the diameter R31 of the picture magnification box MGd, therefore the method determines that the size of the enlarged object OB is greater than that of the picture magnification box MGd, and proceeds to step S145.

In step S145, the picture magnification ratio RTd is adjusted by the picture magnification ratio adjusting unit 145 at the background according to the object OB and the picture magnification box MGd, so that the size of the enlarged object OB will not be greater than that of the picture magnification box MGd. In FIG. 7, dotted lines represent background operations.

In step S146, the object OB is enlarged in the picture magnification box MGd by the picture enlarging unit 146 according to the picture magnification ratio RTd. As indicated in FIG. 7, the presenter can make the entire content of the object OB enlarged and completely displayed without having to move the picture magnification box MGd.

In other words, when the enlarged object OB is too big or may exceed the diameter of the picture magnification box MGd, through the implementation of the technology of the present embodiment, the object OB pointed by the cursor can be enlarged and displayed in the block magnification box MGb.

As disclosed in above embodiments, the technology of the present invention can adaptively enlarge heterogeneous text TX, block BK or picture DW on the slide 900, so that the enlarged text paragraph PG, block group BG or object OB can be displayed in the text magnification box MGt, the block magnification box MGb, the picture magnification box MGd in a most suitable way without bothering the presenter to repeatedly operate the mouse to move the text magnification box MGt, the block magnification box MGb, or the picture magnification box MGd.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An intelligent zooming method for zooming in a text, a block or a picture,
wherein the intelligent zooming method is executed by using an electronic device and comprises:
merging a text paragraph corresponding to the text;
automatically arranging the text paragraph according to the text paragraph and a text magnification box;
enlarging the text paragraph in the text magnification box according to a text magnification ratio;
merging a block group containing the block and other blocks connected thereto;
adjusting a block magnification ratio according to the block group and a block magnification box;
enlarging the block group in the block magnification box according to the block magnification ratio;
cropping the picture to obtain an object;
adjusting a picture magnification ratio according to the object and a picture magnification box; and
enlarging the object in the picture magnification box according to the picture magnification ratio.

2. The intelligent zooming method according to claim 1, wherein the text magnification ratio, the block magnification ratio and the picture magnification ratio are equivalent before adjustments are made.

3. The intelligent zooming method according to claim 1, further comprising:
determining whether an intelligent zooming function is activated;
obtaining a cursor position, if the intelligent zooming function is activated; and
analyzing whether a to-be-enlarged object at the cursor position is the text, the block or the picture.

4. The intelligent zooming method according to claim 1, further comprising:
calculating a width of the text paragraph, which is enlarged, according to the text magnification ratio;
determining whether the width of the text paragraph, which is enlarged, is greater than that of the text magnification box;
wherein if the width of the text paragraph, which is enlarged, is greater than that of the text magnification box, the step of automatically arranging the text paragraph is executed.

5. The intelligent zooming method according to claim 1, further comprising:
determining whether the text paragraph, which is automatically arranged, exceeds the text magnification box; and
adjusting the text magnification ratio, if the text paragraph, which is enlarged and automatically arranged, exceeds the text magnification box.

6. The intelligent zooming method according to claim 1, further comprising:
    calculating a size of the block group, which is enlarged, according to the block magnification ratio;
    determining whether the size of the block group, which is enlarged, is greater than that of the block magnification box;
    wherein if the size of the block group, which is enlarged, exceeds the block magnification box, the step of adjusting the block magnification ratio is executed.

7. The intelligent zooming method according to claim 1, further comprising:
    calculating a size of the object, which is enlarged, according to the picture magnification ratio;
    determining whether the size of the object, which is enlarged, is greater than that of the picture magnification box;
    wherein the step of adjusting the picture magnification ratio is executed, if the size of the object, which is enlarged, is greater than that of the picture magnification box.

8. The intelligent zooming method according to claim 1, wherein the text magnification box, the block magnification box and the picture magnification box have different sizes.

9. The intelligent zooming method according to claim 1, wherein the picture is cropped to obtain a plurality of candidate objects by using a semantic segmentation algorithm, and the object corresponding to a cursor position is selected from the candidate objects.

10. The intelligent zooming method according to claim 9, wherein the semantic segmentation algorithm is a fully-connect neural network (FNN) algorithm, or a recurrent neural network (RNN) algorithm.

11. An electronic device with an intelligent zooming function for zooming in a text, a block or a picture, wherein the electronic device comprises:
    a text merging unit used to merge a text paragraph corresponding to the text;
    an automatic line-feed unit used to automatically arrange the text paragraph according to the text paragraph and a text magnification box;
    a text enlarging unit used to enlarge the text paragraph in the text magnification box according to a text magnification ratio;
    a block merging unit used to merge a block group containing the block and other blocks connected thereto;
    a block magnification ratio adjusting unit used to adjust a block magnification ratio according to the block group and a block magnification box;
    a block enlarging unit used to enlarge the block group in the block magnification box according to the block magnification ratio;
    a picture cropping unit used to crop the picture to obtain an object;
    a picture magnification ratio adjusting unit used to adjust a picture magnification ratio according to the object and a picture magnification box; and
    a picture enlarging unit used to enlarge the object in the picture magnification box according to the picture magnification ratio.

12. The electronic device according to claim 11, wherein the text magnification ratio, the block magnification ratio and the picture magnification ratio are equivalent before adjustments are made.

13. The electronic device according to claim 11, further comprising:
    an actuation unit used to determine whether the intelligent zooming function is activated;
    a cursor event detection unit used to obtain a cursor position if the intelligent zooming function is activated; and
    a content analysis unit used to analyze whether a to-be-enlarged object at the cursor position is the text, the block or the picture.

14. The electronic device according to claim 11, wherein
    the automatic line-feed unit calculates a width of the text paragraph, which is enlarged, according to the text magnification ratio;
    the automatic line-feed unit further determines whether the width of the enlarged text paragraph is greater than that of the text magnification box;
    if the width of the text paragraph, which is enlarged, is greater than that of the text magnification box, the automatic line-feed unit automatically arranges the text paragraph.

15. The electronic device according to claim 11, further comprising:
    a text magnification ratio adjusting unit used to determine whether the text paragraph, which is automatically arranged, exceeds the text magnification box;
    if the text paragraph, which is enlarged and automatically arranged, exceeds the text magnification box, the text magnification ratio adjusting unit adjusts the text magnification ratio.

16. The electronic device according to claim 11, wherein
    the block magnification ratio adjusting unit calculates a size of the block group, which is enlarged, according to the block magnification ratio;
    the block magnification ratio adjusting unit further determines whether the size of the block group, which is enlarged, is greater than that of the block magnification box;
    wherein if the size of the block group, which is enlarged, exceeds the block magnification box, the block magnification ratio adjusting unit adjusts the block magnification ratio.

17. The electronic device according to claim 11, wherein
    the picture magnification ratio adjusting unit calculates a size of the object, which is enlarged, according to the picture magnification ratio;
    the picture magnification ratio adjusting unit determines whether the size of the object, which is enlarged, is greater than that of the picture magnification box;
    wherein if the size of the object, which is enlarged, is greater than that of the picture magnification box, the picture magnification ratio adjusting unit adjusts the picture magnification ratio.

18. The electronic device according to claim 11, wherein the text magnification box, the block magnification box and the picture magnification box have different sizes.

19. The electronic device according to claim 11, wherein the picture cropping unit crops the picture to obtain a plurality of candidate objects by using a semantic segmentation algorithm, and selects the object corresponding to a cursor position from the candidate objects.

20. The electronic device according to claim 19, wherein the semantic segmentation algorithm is a fully-connect neural network (FNN) algorithm, or a recurrent neural network (RNN) algorithm.

* * * * *